May 22, 1934.  H. OSCAR  1,959,441
PAINT BRUSH AND CONTAINER
Filed July 25, 1932
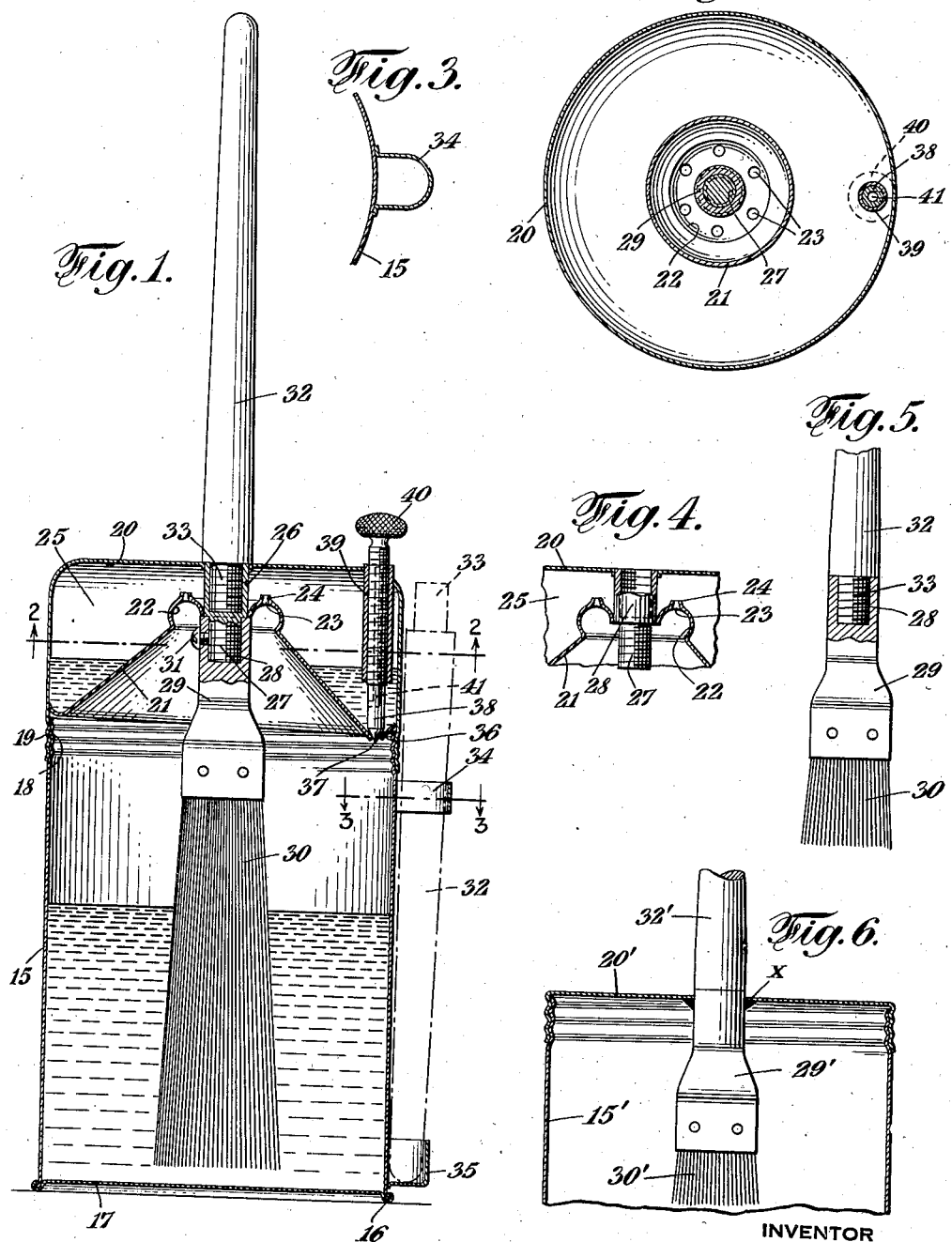
INVENTOR
*Harry Oscar.*
BY
*Warren E. Willis.*
his ATTORNEY Patented May 22, 1934

1,959,441

UNITED STATES PATENT OFFICE 1,959,441

PAINT BRUSH AND CONTAINER

Harry Oscar, New York, N. Y.

Application July 25, 1932, Serial No. 624,562

5 Claims. (Cl. 91—63)

This invention relates to brushes as used in applying liquids, as paints, varnishes, shellacs, lacquers and the like coatings to surfaces, and the receptacles in which the brush is placed when not in use.

Such brushes may be round, or flat, and of varying sizes, each being provided with a handle for manual operation, the brush being usually composed of bristles, hairs or even vegetable fibres, bound at one end tightly together within a ferrule in which is affixed a rigid handle.

The bristles are soft, pliable and yielding before and during use, when saturated by dipping in the paint,—in which term is included any ordinary surface coating consisting of a volatile, oxidizable or evaporative liquid, adqueous or oleaginous, with or without a colored pigment held in suspension.

During use when the brush is filled with paint, if it is raised so that the bristles are uppermost, as frequently occurs in practice, some of the paint will dribble downwardly, daubing the handle, smearing the user's hands and clothing, and becoming irretrievably lost, constituting waste of material.

After use, if the brush is exposed to the air, the volatile or oxidizable elements of the paint become dissipated in the atmosphere and the bristles become united in a hard mass, incapable of further use until cleaned, which is an exceedingly difficult operation to perform, and this condition is intensified if the brush be allowed to rest upon its bristles, thereby being bent out of the proper shape.

Having these matters in mind, it is one of the objects of the present invention to provide a practical means to catch and retain all the drippings from the brush during use and eventually return them in condition for proper application, the device preventing, not only waste of material, but also begriming the handle, and the person using the brush.

A further feature is in the provision of an air tight container that forms a vacuum trap to receive all drippings as they occur from the brush that is held in the vacuum trap and means to release the paint gathered thereby, at any convenient time, to be returned to the supply.

Another purpose is to produce an air tight receptacle for the brush in which it is suspended when not in use, thereby saving the drippings and preventing the brush from becoming dried out, maintaining it in a condition for instant service.

A further feature is in the provision of an air tight container, that forms a vacuum trap on the handle of the brush, this also provides a cover for the paint can, and receives the drippings that run down the handle through small holes in the vacuum trap. When this has an accumulation of liquids, there is a vacuum formed that holds the liquids in the trap in suspension until they are released by opening the needle valve, thus breaking the vacuum by allowing air to enter the trap from the outside of the cover, thereby letting the liquids flow back into the can.

These and other advantageous aims and objects are accomplished by the novel construction, combination and arrangement of parts hereinafter described and illustrated in the accompanying drawing, constituting an essential part of this disclosure, and in which:

Figure 1 is a partial side elevational, partial vertical sectional view of an embodiment of the invention showing its application.

Figure 2 is a transverse sectional view looking on line 2—2 of Fig. 1.

Figure 3 is a fragmentary transverse sectional view looking on line 3—3 of Fig. 1.

Figure 4 is a fragmentary sectional view of the drip container and fixed connections for the brush and handle.

Figure 5 is a view, partially in section, showing the manner of attaching the handle to a brush.

Figure 6 is a fragmentary vertical sectional view showing a modified form of container with a brush fixed in it.

In the drawing a conventional type of cylindrical container is generally designated by the numeral 15, having a bead 16 surrounding its bottom 17 and provided with a rolled screw thread 18 at its open upper edge.

A cover 20 is adapted to engage over the can by its threads 19 and is preferably formed with rounded corner edges as shown.

Fixed permanently in the cover is a conical partition 21, resembling an inverted funnel, its upper edge blending into an annular recess 22 having at the bottom a plurality of perforations 23 so formed as to present inreaching tips 24 adapted to direct liquids into an air tight vacuum chamber 25 formed between the wall of the partition and cover.

Set rigidly in the center of the cover is an internally threaded sleeve 26, its inner extending end terminating in an externally threaded plug 27 adapted to engage in an internally threaded opening 28 in a brush backing or ferrule 29 in which the brush bristles 30 are set, the arrangement being such that the brush is supported above the bottom of the can as shown; if desired a set screw 31 may be used to bind the brush backing to the plug.

The handle 32 of the brush is provided with a threaded end 33 to snugly fit in the threads of the sleeve 26, and also be transferred directly to the brush backing if so desired.

When the handle is removed it may be carried by clips 34 on the side of the can, to rest in a socket 35 at its lower end.

At the lowermost point in the conical partition 21 is a valve seat 36 through which is a passage from the chamber 25 to the container 15, and controlling the passage is the conical point 37 of a valve stem 38 engaged by screw threads in a tubular support 39 fixed in the cover 20.

The outer extending portion of the stem 38 is provided with a knurled operating head 40 by which the valve is adjusted, and the stem 38 contains a vent 41 admitting air to the chamber when its contents are being withdrawn.

In operation, the cover being removed from the container, the brush is firmly attached to the sleeve carried plug and the handle fixed in the sleeve as shown in Figure 1.

When the brush has been dipped in paint, either in the container or other supply, it is used and applied in the customary manner and it will be seen that any drippings from the brush, when it is held with the bristle portion directed upwardly, will fall on the convex wall 21 to enter the recess 22 and pass through the openings 23 into the chamber 25, there to be retained until the cover is replaced on the container and the chamber drained, by opening the valve 38, into the can where the drippings commingle with the paint therein and in which the bristles are submerged.

As the chamber 25 is substantially air tight, and also the receptacle 15 when the cover is screwed in place thereover, the paint is prevented from drying and the brush kept in excellent condition indefinitely.

If for any reason it is desired to unite the handle directly with the brush, as shown in Fig. 5, it is readily done.

In the modification shown in Fig. 6, the container 15' is provided with a plain screw cap 20' in which the brush ferrule 29' is rigidly held axially of the cap, as by solder at the point X, this being a simplified form of the cover previously described.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described the invention what is claimed as new and desired to secure by Letters Patent, is:—

1. In combination, a paint container having a removable cover, a raised conical partition in said cover forming a chamber therein, said partition having perforations, a combined sleeve and plug connector fixed in said cover and partition, said connector having means to detachably engage a brush handle in its sleeve portion and a brush backing on its plug portion to support its bristles above the container bottom.

2. In combination, a paint container having a removable cover, a transverse partition in said cover having an inwardly inclined conical wall to form a chamber therebetween, said wall having a plurality of perforations, a threaded sleeve fixed centrally in said cover and wall to receive a brush handle, a plug on the inner end of said sleeve to screw into a brush backing to support the brush bristles free of the bottom of said container, and means for draining said chamber.

3. In combination, a paint container having a removable cover, a transverse partition in said cover having an inwardly inclined conical wall to form a chamber therebetween, an internally threaded sleeve fixed centrally in said cover and partition wall to engage a brush handle, an externally threaded plug extending inwardly from said sleeve to engage a brush backing, said partition wall having a row of openings concentric with said sleeve, a valve in the lowermost part of said wall, and a valve stem having an operating knob extending through said cover.

4. In combination, a paint container having a removable cover, a transverse partition in said cover having an inwardly inclined conical wall to form a chamber therebetween, an internally threaded sleeve fixed centrally in said cover and partition wall to engage a brush handle, an externally threaded plug extending inwardly from said sleeve to engage a brush backing, said partition wall having a recess concentric with said sleeve, said recess being plurally perforated, means fixed in said cover and partition to engage a brush handle and a brush backing to support a brush above the bottom of the container, a valve in said partition wall leading to said container and, means accessible above said cover to operate the valve.

5. In combination, a paint container having a removable cover, a transverse partition in said cover having an inwardly inclined conical wall to form a chamber therebetween, said wall having its peripheral edge inclined downwardly at one side, an annular recess having a perforate bottom formed in said partition, means at the axis of said cover to support a brush and its handle, a valve set in the lowermost part of said partition, and means to control said valve.

HARRY OSCAR.